US008756006B2

(12) United States Patent
Yamashita et al.

(10) Patent No.: US 8,756,006 B2
(45) Date of Patent: Jun. 17, 2014

(54) DEVICE AND METHOD FOR GENERATING ROUTE RESTRICTION INFORMATION OF INTERSECTION, COMPUTER PROGRAM FOR GENERATING ROUTE RESTRICTION INFORMATION OF INTERSECTION, AND RECORDING MEDIUM FOR RECORDING COMPUTER PROGRAM

(75) Inventors: Yumiko Yamashita, Nagoya (JP); Takashi Yamada, Nagoya (JP); Shintaro Ohsaki, Nagoya (JP); Cheng Li, Nagoya (JP)

(73) Assignee: Toyota Mapmaster Incorporated, Nagoya-shi, Aichi-Ken (JP)

(*) Notice: Subject to any disclaimer, the term of this patent is extended or adjusted under 35 U.S.C. 154(b) by 268 days.

(21) Appl. No.: 13/063,179

(22) PCT Filed: Mar. 15, 2010

(86) PCT No.: PCT/JP2010/001842
§ 371 (c)(1), (2), (4) Date: Mar. 9, 2011

(87) PCT Pub. No.: WO2010/109805
PCT Pub. Date: Sep. 30, 2010

(65) Prior Publication Data

US 2012/0136570 A1 May 31, 2012

(30) Foreign Application Priority Data

Mar. 26, 2009 (JP) ................................. 2009-076939

(51) Int. Cl.
*G01C 21/34* (2006.01)

(52) U.S. Cl.
USPC .......................................... 701/437; 701/435

(58) Field of Classification Search
USPC ..................... 701/1, 400, 408–411, 413–414, 701/423–424, 435, 437
See application file for complete search history.

(56) References Cited

U.S. PATENT DOCUMENTS

| | | | | |
|---|---|---|---|---|
| 5,168,452 | A * | 12/1992 | Yamada et al. | 701/533 |
| 6,324,470 | B1 * | 11/2001 | White | 701/533 |
| 2003/0130788 | A1 * | 7/2003 | Akashi | 701/209 |
| 2009/0138497 | A1 * | 5/2009 | Zavoli et al. | 707/102 |
| 2010/0030459 | A1 * | 2/2010 | Geelen et al. | 701/200 |
| 2010/0256900 | A1 * | 10/2010 | Yamaguchi et al. | 701/201 |

FOREIGN PATENT DOCUMENTS

| | | | |
|---|---|---|---|
| JP | 2003-207355 | A | 7/2003 |
| JP | 2005-267470 | A | 9/2005 |
| JP | 2005-267471 | A | 9/2005 |
| JP | 2005-267472 | A | 9/2005 |
| JP | 2005-284588 | A | 1/2006 |
| JP | 11-154299 | A | 3/2006 |
| JP | 2008-076087 | A | 4/2008 |

* cited by examiner

*Primary Examiner* — Thomas Black
*Assistant Examiner* — Ce Li
(74) *Attorney, Agent, or Firm* — Quarles & Brady LLP; Gavin J. Milczarek-Desai

(57) ABSTRACT

Provided are a device for automatically generating route restriction information of intersections between main roads and narrow streets, and a method therefor. With respect to a specific intersection which is an intersection between a main road and a narrow street, firstly, it is determined to prohibit a right turn and passing through the intersection. Under these conditions, when it is sufficiently confirmed, by using external information, that the right turn and passing through the intersection can be allowed at the specific intersection, the route restriction regarding the direction is released. Probe information and traffic restriction data are used for the external information.

14 Claims, 10 Drawing Sheets

DEVICE AND METHOD FOR GENERATING ROUTE RESTRICTION INFORMATION OF INTERSECTION, COMPUTER PROGRAM FOR GENERATING ROUTE RESTRICTION INFORMATION OF INTERSECTION, AND RECORDING MEDIUM FOR RECORDING COMPUTER PROGRAM

TECHNICAL FIELD

The present invention relates to an apparatus and a method for generating intersection route regulation information. More particularly, the present invention relates to a technique that is suitable for determining if a right turn is allowed at a specific intersection as the content of a road map for navigation systems, etc. and/or passing through the specific intersection is allowed.

BACKGROUND ART

In related art, the content (roads, intersections, traffic signals, etc.) of the road map for use in navigation apparatuses has been obtained and updated by fieldwork. For example, a person in charge is assigned to each area, and each person in charge goes around the assigned area to verify the data (road information) of the content of the road map.

Regarding the intersections, when searching for a route, intersections provided with the road information (such as route regulation information) (herein referred to as the "reference intersections") are associated with region data of an upper level so that such intersections are preferentially selected. Search efficiency and safety of route guidance have been increased in this manner. As used herein, the "route regulation information" includes "traveling in designated directions only," "follow directions on lanes," "no entry," etc. Such road information is used to operate navigation systems. However, conducting field research on all the intersections as the reference intersections is not practical as it is extremely time-consuming and requires a very high cost. Thus, it is necessary to individually set standards to limit the number of intersections to be researched.

Moreover, a significant amount of time and cost is required to update such road information by human labor.

In order to save labor, techniques of automatically extracting an object to be updated are introduced in Patent Documents 1 to 3. In such techniques, probe cars are used to collect road information.

RELATED ART DOCUMENTS

Patent Documents

[Patent Document 1] Japanese Patent Application Publication No. JP-A-2005-267470

[Patent Document 2] Japanese Patent Application Publication No. JP-A-2005-267471

[Patent Document 3] Japanese Patent Application Publication No. JP-A-2005-267472

[Patent Document 4] Japanese Patent Application Publication No. JP-A-2003-207355

DISCLOSURE OF THE INVENTION

Problem to be Solved by the Invention

There is a demand for more detailed guidance in recent navigation apparatuses, and such a route search function to preferentially select intersections of main roads as in related arts is not enough in situations such as when a destination faces a narrow street.

Thus, in order to implement detailed route search and guidance, the inventors have intensively studied how to automatically set route regulation information regarding intersections of narrow streets. As a result, the inventors found the following problems.

Regarding an intersection of a narrow street and a narrow street, if there is no traffic regulation such as "one-way traffic" and "traveling in designated directions only," allowing traveling in all directions at this intersection (that is, no route regulation), for example, does not have a significant impact. Because there is a relatively small amount of traffic at such an intersection, the driver does not feel so much stressed even if an intersection that is not necessarily optimal is selected.

On the other hand, at an intersection of a main road and a narrow street (herein referred to as the "specific intersection"), there is a large amount of traffic on the main road, and extreme caution is required for route directions, especially a right turn and passing through the intersection across the main road, for safety reasons.

One possible solution is to completely restrict the route directions at such an intersection, namely the right turn and passing through the intersection across the main road. However, if all of such specific intersections are provided with this route regulation information, the driver takes a roundabout route along the main road in situations such as especially when a destination or a starting location faces the narrow street close to the main road. Thus, the guided route does not necessarily match the driver's sense of driving on site.

Patent Document 4 is a document disclosing related art of the present invention.

It is an object of the present invention to provide an apparatus and a method capable of automatically determining if a right turn is allowed at an actual intersection and passing through the actual intersection is allowed, so that a road map for navigation can be provided with route regulation information.

Means for Solving the Problem

It is an object of the present invention to solve the above problem.

Routes that are provided by the navigation apparatuses need to comply with traffic regulations, and the highest priority should be given to safety. Thus, a right turn and passing through the intersection are first prohibited for the specific intersections. Under such conditions, if it sufficiently confirmed from external information that a right turn and/or passing through the intersection can be allowed at the specific intersection, the route regulations regarding these directions are eliminated.

That is, a first aspect of the present invention is defined as follows.

An apparatus for generating intersection route regulation information including: a first memory section that stores first route regulation information of each intersection; a probe information processing/determining device that processes probe information to make a determination; a probe determination information storage section that stores probe determination information obtained by the probe information processing/determining device; a determination object intersection designating device that designates an intersection to be determined in road map information; a determination object intersection selecting device that refers to the first memory section for the designated intersections to be determined, and selects the intersections to be determined without the first route regulation information provided; a second route regulation information providing device that provides each specific intersection of a main road and a narrow street, among the selected intersections to be determined, with second route regulation information that indicates that a right turn and passing through the specific intersection are prohibited; a route regulation information verifying/correcting device that verifies the second route regulation information provided to the specific intersection, based on the probe determination information, and corrects the second route regulation information based on the result of the verification; a third route regulation information generating device that generates third route regulation information based on the result of the verification and correction of the route regulation information verifying/correcting device; and a third memory section that stores the third route regulation information in association with the specific intersection.

According to the apparatus for generating route regulation information as defined above, safety can be ensured, and the specific intersections can be automatically provided with the route regulation information (the third route regulation information). The use of the third route regulation information regarding the specific intersections enables the navigation apparatuses to provide more detailed route search and guidance.

A second aspect of the present invention is defined as follows.

In the apparatus for generating route regulation information as defined in the first aspect, the probe information processing/determining device may further include a probe information memory section that stores the probe information, a first extraction region memory section that stores a first extraction region as a region for extracting the probe information of a vehicle that is estimated to have turned right at the specific intersection, a first probe information extracting device that extracts, from the probe information read from the probe information memory section, the probe information that has first travel history for which it is determined that the vehicle has turned right at the specific intersection, among travel histories of the probe information in the first extraction region, a first count device that counts, for each specific intersection, the number of the first travel histories extracted by the first probe information extracting device, and a first determining device that determines that a right turn is allowed at the specific intersection whose first count value counted by the first count device is equal to or larger than a first threshold value.

According to the apparatus for generating route regulation information of the second aspect as defined above, if a large number (equal to or larger than the first threshold value) of the first travel histories being determined that the vehicle has turned right at the specific intersection are present in the travel histories of probe cars in the first extraction region that is set to the specific intersection, it is determined that a right turn is allowed at the specific intersection, as it can be confirmed that a large number of vehicles have turned right at the specific intersection.

A third aspect of the present invention is defined as follows.

In the apparatus for generating route regulation information as defined in the first or second aspect, the probe information processing/determining device may further include a second extraction region memory section that stores a second extraction region as a region for extracting the probe information of the vehicle that is estimated to have passed through the specific intersection, a second probe information extracting device that extracts, from the probe information read from the probe information memory section, the probe information that has second travel history for which it is determined that the vehicle has passed through the specific intersection, among travel histories of the probe information in the second extraction region, a second count device that counts, for each specific intersection, the number of the second travel histories extracted by the second probe information extracting device, and a second determining device that determines that passing through the specific intersection is allowed if the specific intersection has second count value counted by the second count device being equal to or larger than a second threshold value.

According to the apparatus for generating route regulation information of the third aspect as defined above, if a large number (equal to or larger than the second threshold value) of the second travel histories being determined that the vehicle has passed through the specific intersection are present in the travel histories of probe cars in the second extraction region that is set to the specific intersection, it is determined that passing through the specific intersection is allowed, because the fact that a large number of vehicles have passed through the specific intersection is confirmed.

A fourth aspect of the present invention is defined as follows.

In the apparatus for generating route regulation information as defined in the second aspect, the first count device may further count, for each of designated conditions, the number of the first travel histories extracted by the first probe information extracting device, the first determining device makes the determination for each of the designated conditions with respect to the first travel histories counted for each of the designated conditions, and the third memory section stores for each of the designated conditions the third route regulation information in association with the specific intersection.

According to the apparatus for generating route regulation information of the fourth aspect as defined above, whether turning right is allowed or not can be determined for each of the designated conditions.

A fifth aspect of the present invention is defined as follows.

In the apparatus for generating route regulation information as defined in the third aspect, the second count device may further count, for each of designated conditions, the number of the second travel histories extracted by the second probe information extracting device, the second determining device may make the determination for each of the designated conditions with respect to the second travel histories counted for each of the designated conditions, and the third memory section may store for each of the designated conditions the third route regulation information in association with the specific intersection.

According to the apparatus for generating route regulation information of the fifth aspect as defined above, whether passing through the intersection is allowed or not can be determined for each of the designated conditions.

According to sixth and seventh aspects of the present invention, in the fourth and fifth aspects, the designated conditions may include a time slot, a day of a week, and/or time required for turning right at the specific intersection and for passing through the specific intersection.

An eighth aspect of the present invention is defined as follows.

A method for generating intersection route regulation information is characterized by including: a probe information processing/determining step of processing probe information to make a determination; a determination object intersection designating step of designating an intersection to be determined in road map information; a determination object intersection selecting step of referring to a first memory section that stores first route regulation information for the designated intersections to be determined, and selecting the intersections to be determined without the first route regulation information provided; a second route regulation information providing step of providing each specific intersection of a main road and a narrow street, among the selected intersections to be determined, with second route regulation information that indicates that a right turn and passing through the specific intersection are prohibited; a route regulation information verifying/correcting step of verifying the second route regulation information provided to the specific intersection based on probe determination information obtained in the probe information processing/determining step, and correcting the second route regulation information based on the result of the verification; and a third route regulation information generating step of generating third route regulation information based on the result of the verification and correction in the route regulation information verifying/correcting step.

The method for generating route regulation information of the eighth aspect as defined above provides functions similar to those of the first aspect.

A ninth aspect of the present invention is defined as follows.

In the eighth aspect, the probe information processing/determining step may further include a first extraction region setting step of setting a first extraction region as a region for extracting the probe information of a vehicle that is estimated to have turned right at the specific intersection, a first probe information extracting step of extracting, from the probe information read from a probe information memory section that stores the probe information, the probe information that has first travel history for which it is determined that the vehicle has turned right at the specific intersection, among travel histories of the probe information in the first extraction region, a first count step of counting, for each specific intersection, the number of the first travel histories extracted in the first probe information extracting step, and a first determining step of determining that a right turn is allowed at the specific intersection whose first count value counted in the first count step being equal to or larger than a first threshold value.

The method for generating route regulation information of the ninth aspect as defined above provides functions similar to those of the second aspect.

A tenth aspect of the present invention is defined as follows.

In the eighth or ninth aspect, the probe information processing/determining step may further include a second extraction region setting step of setting a second extraction region as a region for extracting the probe information of the vehicle that is estimated to have passed through the specific intersection, a second probe information extracting step of extracting, from the probe information read from the probe information memory section, the probe information that has second travel histories being determined that the vehicle has passed through the specific intersection, among travel histories of the probe information in the second extraction region, a second count step of counting, for each specific intersection, the number of the second travel histories extracted in the second probe information extracting step, and a second determining step of determining that passing through the specific intersection is allowed if said specific intersection has second count value counted in the second count step being equal to or larger than a second threshold value.

The method for generating route regulation information of the tenth aspect as defined above provides functions similar to those of the third aspect.

An eleventh aspect of the present invention is defined as follows.

In the ninth aspect, in the first count step, the number of the first travel histories extracted in the first probe information extracting step may further be counted for each of designated conditions, and in the first determining step, the determination may be made for each of the designated conditions with respect to the first travel histories counted for each of the designated conditions.

The method for generating route regulation information of the eleventh aspect as defined above provides functions similar to those of the fourth aspect.

A twelfth aspect of the present invention is defined as follows.

In the tenth aspect, in the second count step, the number of the second travel histories extracted in the second probe information extracting step may further be counted for each of designated conditions, and in the second determining step, the determination may be made for each of the designated conditions with respect to the second travel histories counted for each of the designated conditions.

The method for generating route regulation information of the twelfth aspect as defined above provides functions similar to those of the fifth aspect.

According to thirteenth and fourteenth aspects of the present invention, in the eleventh and twelfth aspects, the designated conditions may include a time slot, a day of a week, and/or time required for turning right at the specific intersection and for passing through the specific intersection.

Moreover, a fifteenth aspect of the present invention is defined as follows.

A computer program for generating intersection route regulation information is characterized by causing a computer to function as a probe information processing/determining device that processes probe information to make a determination, a determination object intersection designating device that designates an intersection to be determined in road map information, a determination object intersection selecting device that refers to a first memory section that stores first route regulation information of each intersection for the designated intersections to be determined, and selects the intersections to be determined without the first route regulation information provided, a second route regulation information providing device that provides each specific intersection of a main road and a narrow street, among the selected intersections to be determined, with second route regulation information that indicates that a right turn and passing through the specific intersection are prohibited, a route regulation information verifying/correcting device that verifies the second route regulation information provided to the specific intersection based on probe determination information obtained by the probe information processing/determining device, and corrects the second route regulation information based on the result of the verification, and a third route regulation information generating device that generates third route regulation information based on the result of the verification and correction of the route regulation information verifying/correcting device.

The computer program of the fifteenth aspect as defined above provides functions similar to those of the first aspect.

A sixteenth aspect of the present invention is defined as follows.

In the fifteenth aspect, the computer program may further cause the computer to function as, in the probe information processing/determining device, a first extraction region setting device that sets a first extraction region as a region for extracting the probe information of a vehicle that is estimated to have turned right at the specific intersection, a first probe information extracting device that extracts, from the probe information read from a probe information memory section that stores the probe information, the probe information that has first travel history for which it is determined that the vehicle has turned right at the specific intersection, among travel histories of the probe information in the first extraction region, a first count device that counts, for each specific intersection, the number of the first travel histories extracted by the first probe information extracting device, and a first determining device that determines that a right turn is allowed at the specific intersection whose first count value counted by the first count device is equal to or larger than a first threshold value.

The computer program of the sixteenth aspect as defined above provides functions similar to those of the second aspect.

A seventeenth aspect of the present invention is defined as follows.

In the fifteenth or sixteenth aspect, the computer program may further cause the computer to function as, in the probe information processing/determining device, a second extraction region setting device that sets a second extraction region as a region for extracting the probe information of the vehicle that is estimated to have passed through the specific intersection, a second probe information extracting device that extracts, from the probe information read from the probe information memory section, the probe information that has second travel histories being determined that the vehicle has passed through the specific intersection, among travel histories of the probe information in the second extraction region, a second count device that counts, for each specific intersection, the number of the second travel histories extracted by the second probe information extracting device, and a second determining device that determines that passing through the specific intersection is allowed if the specific intersection has second count value counted by the second count device is equal to or larger than a second threshold value.

The computer program of the seventeenth aspect as defined above provides functions similar to those of the third aspect.

An eighteenth aspect of the present invention is defined as follows.

In the sixteenth aspect, the first count device may further count, for each of designated conditions, the number of the first travel histories extracted by the first probe information extracting device, and the first determining device may make the determination for each of the designated conditions with respect to the first travel histories counted for each of the designated conditions.

The computer program of the eighteenth aspect as defined above provides functions similar to those of the fourth aspect.

A nineteenth aspect of the present invention is defined as follows.

In the seventeenth aspect, the second count device may further count, for each of designated conditions, the number of the second travel histories extracted by the second probe information extracting device, and the second determining device may make the determination for each of the designated conditions with respect to the second travel histories counted for each of the designated conditions.

The computer program of the nineteenth aspect as defined above provides functions similar to those of the fifth aspect.

According to twentieth and twenty first aspects of the present invention, in the eighteenth and nineteenth aspects, the designated conditions may include a time slot, a day of a week, and/or time required for turning right at the specific intersection and for passing through the specific intersection.

A recording medium that records the computer program defined in the fifteenth to twenty first aspects is defined as a twenty second aspect.

BEST MODES FOR CARRYING OUT THE INVENTION

Embodiments of the present invention will be described below.

Figure 1:
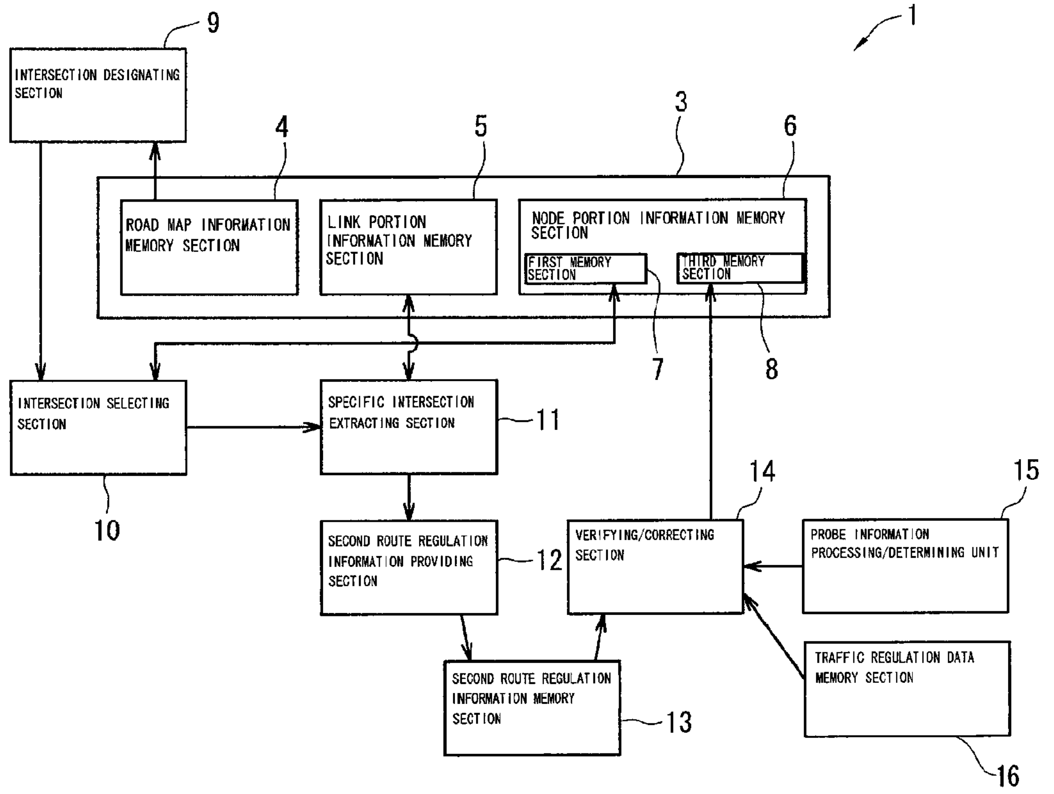
FIG. 1 is a block diagram showing the structure of a route regulation information generating apparatus according to an embodiment of the present invention.

FIG. 1 is a functional block diagram of a route regulation information generating apparatus 1 of an embodiment of the present invention.

A road data memory 3 as one of components of the route regulation information generating apparatus 1 has a road map information memory section 4, a link portion information memory section 5, and a node portion information memory section 6. Data that is stored in the road data memory 3 is used to search for routes in a navigation apparatus.

For example, a national road map of Japan is stored as digital data in the road map information memory section 4. Various types of road information (the number of lanes, the lane width, the road type, etc.) are stored in the link portion information memory section 5, in association with each road in the road map. Various types of road information (route regulation information, the presence or absence of a traffic signal, etc.) are stored in the node portion information memory section 6, in association with intersections in the road map. The node portion information memory section 6 includes a first memory section 7 and a third memory section 8. The first memory section 7 is provided with route regulation information associated with the intersections. The route regulation information in the first memory section 7 is the information obtained in advance by fieldwork (first route regulation information). As described below, third route regulation information is stored in the third memory section 8.

Both the first route regulation information that is stored in the first memory section 7 and the third route regulation information that is stored in the third memory section 8 are present in the node portion information memory section 6. The use of such a data storage structure facilitates handling of the first and third route regulation information in the navigation apparatus. As compared with the first route regulation information that is associated with region data of a relatively high level, the third route regulation information is associated with region data of a relatively low level. Thus, the third route regulation information is effectively used to search for narrow streets near a starting location or a destination.

An intersection designating section 9 sequentially selects regions to be processed on each mesh (e.g., 1 km×1 km) on the road map, and designates every intersection included in each region.

An intersection selecting section 10 refers to the content of the first memory section 7 to select those intersections which are not provided with the first route regulation information, from the intersections designated by the intersection designating section 9.

A specific intersection extracting section 11 refers to the link portion information memory section 5 to extract intersections of main roads and narrow streets (specific intersections) from the intersections selected by the intersection selecting section 10.

A second route regulation information providing section 12 provides the specific intersections extracted by the specific intersection extracting section 11, with second route regulation information indicating that both a right turn and passing through the intersection are prohibited, and stores this in a second route regulation information memory 13.

The route information regulation generating apparatus 1 of the embodiment of the present invention has a probe information processing/determining unit 15, and sends probe determination information, which is obtained by processing probe information of probe cars for making a determination, to a verifying/correcting section 14 described later.

In the present invention, the probe information of the probe car includes at least coordinate information (latitude and longitude) of the probe car, and azimuth information when the probe car is located at the coordinates. Any vehicle having a position detection function such as a GPS can specify the information. As described in, e.g., Japanese Patent Application Publication No. JP-A-2002-150495, systems for bi-directionally transmitting information between a navigation system of a vehicle and a base station are well known in the art. Thus, by using such information transmission systems, ordinary vehicles equipped with navigation systems can be used as the probe cars. It should be understood that it is not intended to exclude the use of probe cars equipped with dedicated units for collecting road information.

In addition to the coordinate information and the azimuth information, information on the vehicle conditions of the probe cars can also be used as the probe information. The information on the vehicle conditions of the probe cars include time information of the probe cars, and information on turn signals, a steering wheel, brakes, lights, and a speed. More specifically, the on/off state is detected for the turn signals, the brakes, and the lights, the rotation angle is detected for the steering wheel, and the value of a speedometer is detected for the speed. In addition, identification (ID) information specifying the probe car, altitude information, an accelerator operation amount, an engine speed, forward or rearward acceleration, a yaw rate, a stop lamp, an ABS warning lamp, a fuel consumption amount, the remaining power capacity, shift lever information, etc. can be included as the probe information.

Moreover, information on starting and stopping of the vehicle can also be used as the probe information.

Information corrected by map matching etc. can also be used as the probe information. This can reduce errors included in the probe information.

As used herein, the "map matching" refers to a technique that prevents the probe car from deviating from the road in map information in a car navigation system. Thus, the probe car is always located on the road. In order to perform the map matching, a travel trace is formed in the car navigation system from the coordinate information, azimuth information, travel distance, etc. of the probe car, and this travel trace is compared with road shape data included in the map information. As there are a plurality of pieces of road shape data, these pieces of road shape data are weighted according to predetermined priority, and one road is selected. Then, the coordinates of the probe car are changed to those on the road.

For more details, see Car Navigation System (Open-type Data Structure KIWI and Its Usage), Section 4, Kyoritsu Shuppan Co., Ltd, etc.

This map matching may be performed by the base station that has received the probe information from the probe car.

In the present invention, the probe information, associated with those intersections for which whether a right turn is allowed and/or passing through the intersection is allowed is to be determined, is extracted based on travel histories thereof.

In a first extraction region that is set to the specific intersection, the travel histories of the probe information are traced to extract first travel histories that are determined to be formed by vehicles that have turned right at the intersection. The first travel histories are travel histories that are produced by those probe cars which actually turned right at the specific intersection.

Similarly, in a second extraction region that is set to the specific intersection, the travel histories of the probe information are traced to extract second travel histories that are determined to be formed by vehicles that have passed through the intersection. The second travel histories are travel histories that are produced by those probe cars which actually passed through the specific intersection.

Figure 4:
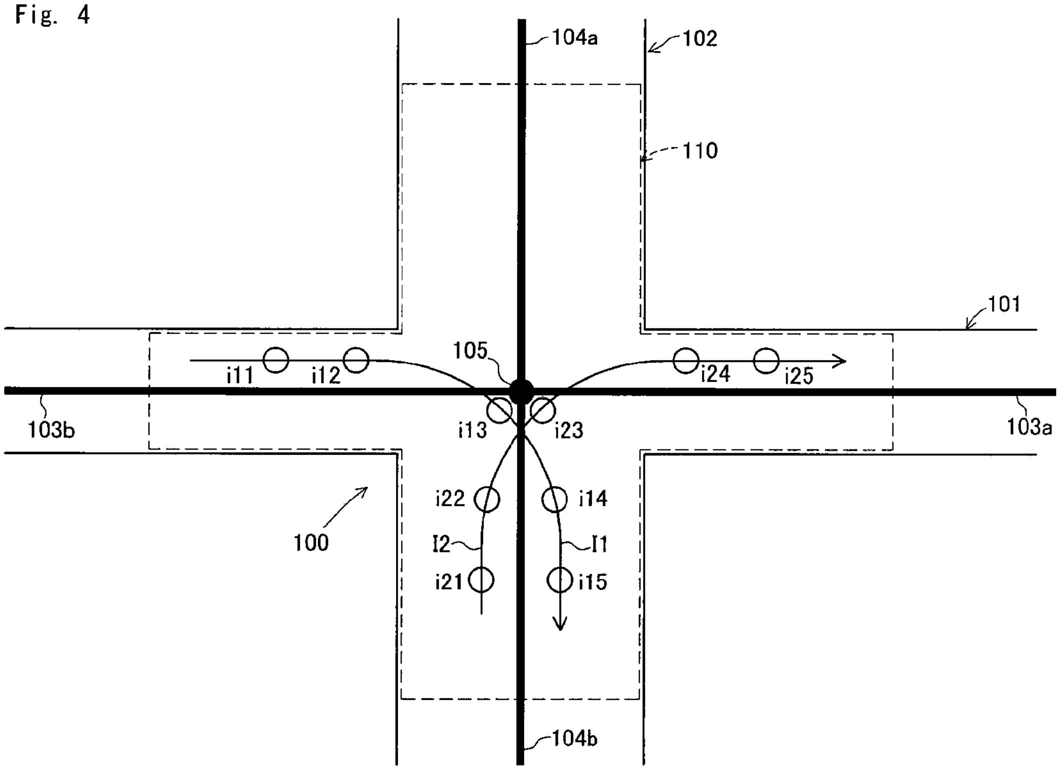
FIG. 4 is a schematic diagram illustrating a method for extracting travel histories being determined that a vehicle has turned right at a specific intersection.

As shown in FIG. 4, a first extraction region 110 is set for a specific intersection 100, and a narrow street 101 and a main road 102 crossing at this specific intersection. The probe information that is present in the first extraction region 110 is extracted to trace travel histories thereof.

As shown in FIG. 4, the first extraction region 110 is defined by providing a first width centering about a link 103 corresponding to the narrow street 101, and for the main road 102, providing a link 104 with a road width defined by the road information (if there is no road information on the road width, providing a second width (which is greater than the first width of the narrow street 101)). Note that the outer edge of the extraction region 110 is located at a predetermined distance (e.g., 50 m) from a node 105 corresponding to the specific intersection 100.

Examples I1, I2 of first travel histories I corresponding to right turns are shown in FIG. 4. The travel history I1 is a first travel history that is formed by probe information i11 to i15. That is, the travel history I1 is formed by the probe information of the probe car that travels along a link 103*b* on the narrow street 101 and turns right at the specific intersection 100 onto the main road 102 along a link 104*b* in the first extraction region 110.

Similarly, the travel history I2, which is formed by probe information i21 to i25, is formed by the probe information of the probe car that travels along the link 104*b* on the main road 102 and turns right at the specific intersection 100 onto the narrow street 101 along a link 103*a* in the extraction region 110.

Regarding the specific intersection 100, a travel history of a right turn from the link 103*a* to a link 104*a*, and a travel history of a right turn from the link 104*a* to the link 103*b* are also the first travel histories.

Turn signal information, steering wheel angle information, etc. can be referred to when determining from tracing of the probe information if a right turn was made or not.

The number of first travel histories I that are present in the first extraction region 110 are counted for each specific intersection, and whether a right turn is allowed or not is determined based on the count value.

For example, if a sufficient number of (e.g., a first threshold value or more: e.g., 100 or more) first travel histories I are present in the first extraction region 110, it means that many probe cars actually turned right at the specific intersection. Thus, it is reasonable to determine that a right turn is allowed at the specific intersection.

Regarding the specific intersection for which the number of first travel histories I in the first extraction region 110 is zero, it should be determined that it is impossible to turn right at the specific intersection. In the case where only several first travel histories I are present as well, it cannot be determined in view of the possibility of errors that a right turn is allowed. Moreover, information that the number of first travel histories I at the specific intersection is zero can provide the specific intersection having no information on the presence or absence of a median strip with information supposing that the median strip is present at the specific intersection. This information can be used as an alternative to information obtained by field research.

On the other hand, if at least a considerable number of (a second threshold value: e.g., several tens of) first travel histories I, although the number does not reach the first threshold value, are present in the first extraction region 110, road information associated with the node 105, the link 103, and the link 104 of the specific intersection is referred to when determining if a right turn is not allowed at the specific intersection 100. For example, if the road width is large (which indicates that there are a plurality of lanes each way), it is difficult to turn right due to a large number of oncoming cars. Thus, the road information of the link is information that denies the possibility of a right turn.

Figure 5:
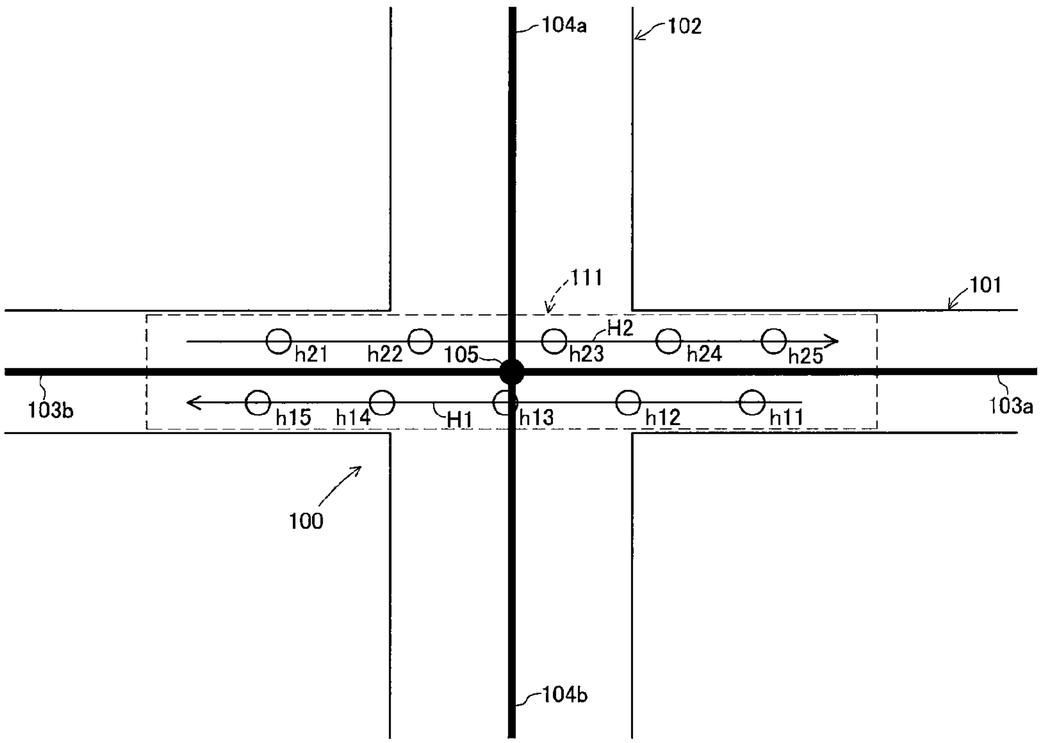
FIG. 5 is a schematic diagram illustrating a method for extracting travel histories being determined that a vehicle has passed through a specific intersection.

As shown in FIG. 5, a second extraction region 111 is set for the specific intersection 100, and the narrow street 101 and the main road 102 crossing at this specific intersection. In FIG. 5, the same elements as those of FIG. 4 are denoted by the same reference characters, and description thereof will be omitted. The probe information that is present in the second extraction region 111 is extracted to trace travel histories thereof.

As shown in FIG. 5, the second extraction region 111 is defined by providing a first width centering about the link 103*a* corresponding to the narrow street 101, and locating the outer edge of the second extraction region 111 at a predetermined distance (e.g., 20 m) from the node 105 corresponding to the specific intersection 100.

Examples H1, H2 of second travel histories H corresponding to passing through the intersection across the main road is shown in FIG. 5. The travel history H1 is a travel history that is formed by probe information h11 to h15. That is, the travel history H1 is formed by the probe information of the probe car that travels along the link 103*a* on the narrow street 101, passes through the specific intersection 100, and travels as it is along the link 103*b* on the narrow street 101 in the second extraction region 111. Similarly, the travel history H2 is formed by probe information h21 to h25.

The number of second travel histories H that are present in the second extraction region 111 are counted for each specific intersection, and whether passing through the specific intersection is allowed or not is determined based on the count value by a method similar to the above method used to determine if a right turn is allowed.

Figure 2:
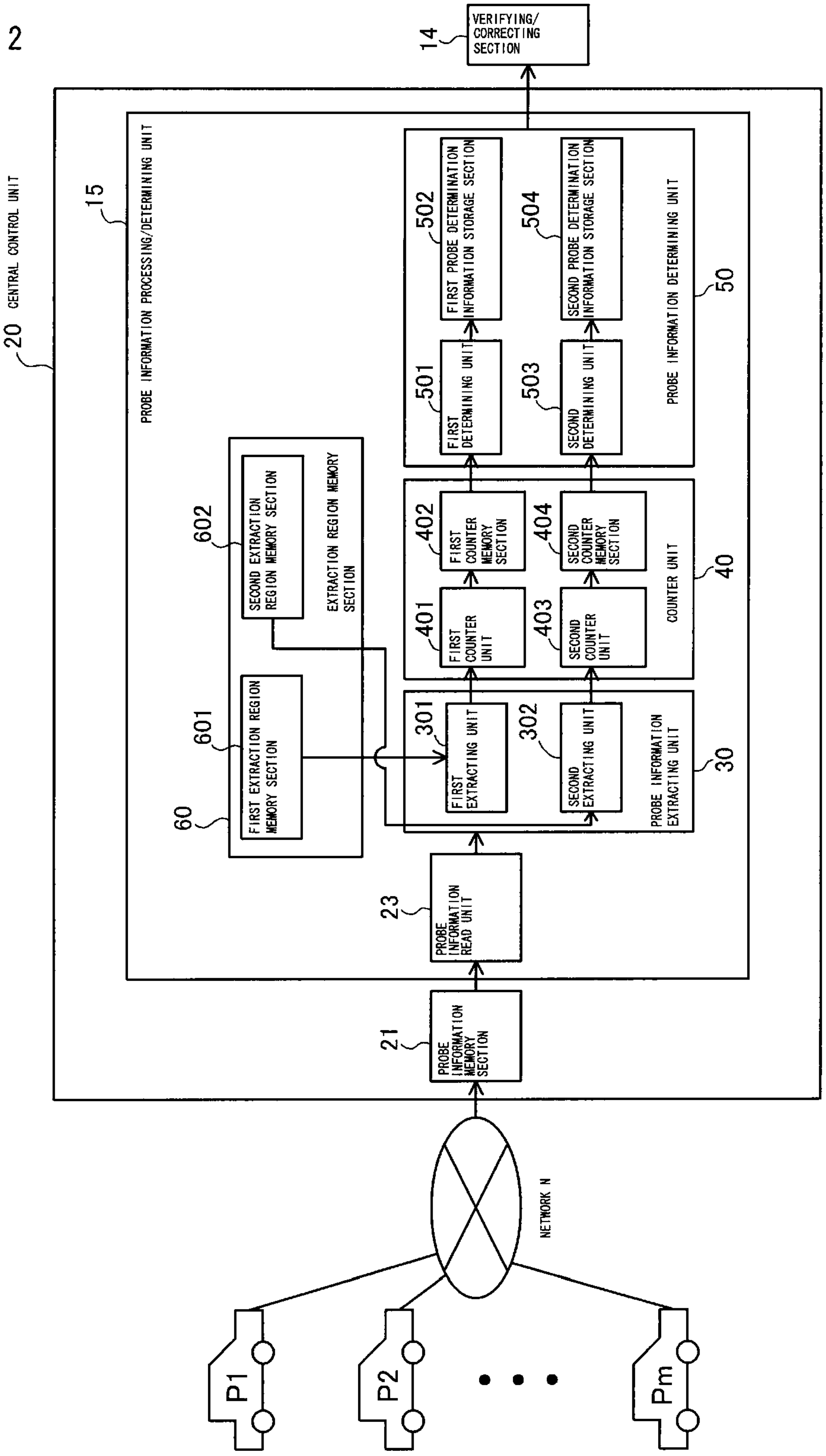
FIG. 2 is a block diagram showing the structure of a probe information processing/determining unit according to the embodiment of the present invention.

FIG. 2 is a functional block diagram of the probe information processing/determining unit 15.

Computers in probe cars P1, P2 . . . Pm are wirelessly linked to a network N such as the Internet. Each probe car sends out probe information at predetermined intervals. This probe information includes current coordinate information (X, Y), azimuth information (D), time (T), and other information of the probe car. This probe information is transmitted to a central control unit 20 via the network N, and stored in a probe information memory section 21 thereof.

The method for transmitting the probe information is not limited to the method using the network. The probe information may be first stored in a memory in the probe car, and then may be supplied from the memory to the probe information memory section 21 directly or via wired transmission.

The probe information processing/determining unit 15 includes a specific intersection coordinate providing unit (not shown) in order to specify an intersection to be determined. If the operator designates a certain intersection in this unit, the node 105 of this intersection is read from a memory (not shown), and as shown in FIGS. 4 and 5, the extraction regions 110, 111 centering about the node 105 are automatically designated. After the first extraction region 110 and the second extraction region 111 are specified, the specified first and second extraction regions 110, 111 are stored in a first extraction region memory section 601 and a second extraction region memory section 602 in an extraction region memory section 60, respectively.

The probe information stored in the probe information memory section 21 is read by a probe information read unit 23, and the first extraction region is read from the first extraction region memory section 601. In a first probe information extracting unit 301, the travel histories formed by the probe information are compared with the first extraction region 110.

In the first probe information extracting unit 301, the first travel histories are extracted from the travel histories that are present in the first extraction region 110, and are transmitted, for each specific intersection, to a first counter unit 401. The first counter unit 401 counts the number of first travel histories that are transmitted from the first probe information extracting unit 301, and stores a first count value in a first counter memory section 402. This first count value represents the number of valid first travel histories that are present in the first extraction region 110 in FIG. 4.

The first count value is compared with a predetermined threshold value in a first probe information determining unit 501. That is, if the first count value is equal to or larger than the first threshold value, it is determined that a right turn is allowed. The determination result is stored in a first probe determination information storage section 502.

Whether passing through the intersection is allowed or not is also determined by a method similar to the above method. That is, in a second probe information extracting unit 302, the second travel histories are extracted from the travel histories that are present in the second extraction region 111, and are transmitted, for each specific intersection, to a second counter unit 403. A second count value of the second travel histories stored in a second counter memory section 404 is compared with a predetermined threshold value in a second probe information determining unit 503. The second count value represents the number of valid second travel histories that are present in the second extraction region 111 in FIG. 5. Thus, if the second count value is equal to or larger than the second threshold value, it is determined that passing through the intersection is allowed. The determination result is stored in a second probe determination information storage section 504.

Returning to FIG. 1, a traffic regulation data memory section 16 for storing traffic regulation data is provided in the present embodiment. The traffic regulation data associated with the intersections includes the presence or absence of a traffic signal, "traveling in designated directions only," "follow directions on lanes," etc.

The verifying/correcting section 14 reads the specific intersection from the second route regulation information memory section 13, and refers to the probe information processing/determining unit 15 to verify the probe determination information of the specific intersection. If the probe determination information indicates that a right turn is allowed and/or passing through the intersection is allowed, the verifying/correcting section 14 corrects the second route regulation information provided to the specific intersection, so that the second route regulation information indicates that a right turn is allowed and/or passing through the intersection is allowed. Regarding the probe determination information other than that described above, the second route regulation information (a right turn and passing through the intersection are prohibited) of the specific intersection is maintained as it is. In the present embodiment, the verifying/correcting section 14 further refers to the traffic regulation data memory section 16 to perform verification. Verification rules can be arbitrarily set, but in this example, traveling in all directions is allowed at the specific intersection if there is a traffic signal at this specific intersection. Even if the traffic regulation data of "traveling in designated directions only" is present for the specific intersection, a right turn or passing through the intersection is allowed at the specific intersection if the traffic regulations allow a right turn or passing through the intersection in the travel direction toward this specific intersection. Regarding the traffic regulation data other than that described above, the second route regulation information (a right turn and passing through the intersection are prohibited) of the specific intersection is maintained as it is.

The route regulation information of the specific intersection thus verified and corrected by the verifying/correcting section 14 is stored as the third route regulation information in the third memory section 8 of the node portion information memory section 6.

The verifying/correcting section 14 can correct the second route regulation information so that the second route regulation information indicates that a right turn is allowed and/or passing through the intersection is allowed, only when such a determination result is obtained that both the probe determination information and the traffic regulation data indicate that a right turn is allowed and/or passing through the intersection is allowed.

Figure 3:
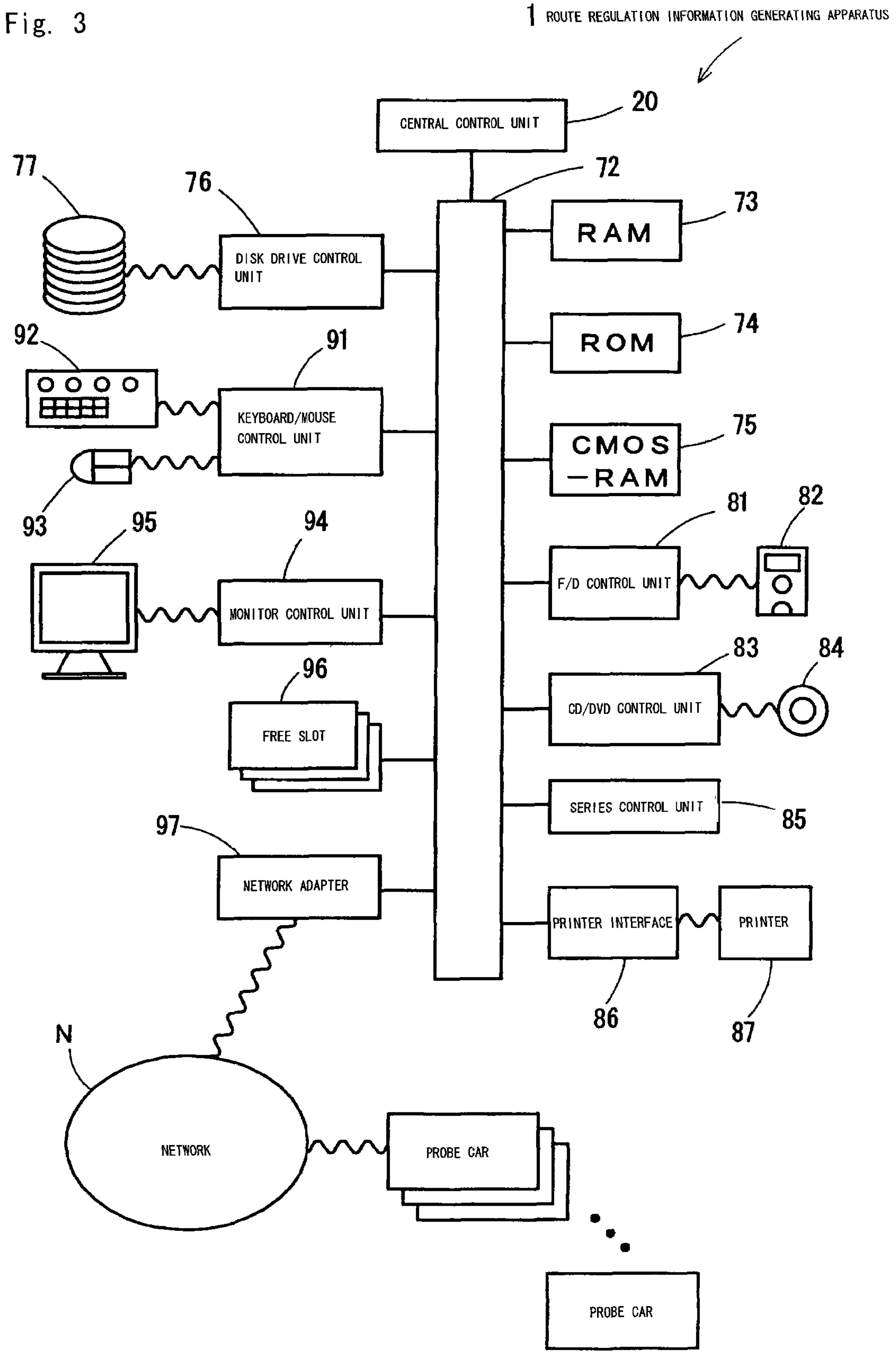
FIG. 3 shows a computer system that forms the route regulation information generating unit of the embodiment.

FIG. 3 is a block diagram showing the hardware configuration of the route regulation information generating apparatus 1.

The hardware configuration of the apparatus 1 is such that various elements are coupled to the central control unit 20 via a system bus 72 as in typical computer systems.

The central control unit 20 includes a general-purpose central processing unit (CPU), a memory control unit, a bus control unit, an interrupt control unit, and a direct memory access (DMA) unit, and the system bus 72 includes a data line, an address line, and a control line. A memory circuit formed by a RAM (random access memory) 73 and a nonvolatile memory (a ROM 74, a CMOS-RAM 75, etc.) is connected to the system bus 72. Data that is stored in the RAM 73 is read and rewritten by the central control unit 20 and other hardware elements. Data in the nonvolatile memory is read-only data, and not lost even if the unit is turned off. A system program for controlling the hardware is stored in a hard disk unit 77, also stored in the RAM 73, and read as appropriate into the central control unit 20 via a disk drive control unit 76 and used. A region for storing a computer program for operating a computer system having a general-purpose configuration as the route regulation information generating apparatus 1 is secured in the hard disk unit 77.

The map information and the road information are stored in a predetermined region of the hard disk unit 77. The map information includes nodes and links for designating roads, and the road information includes the road type, the speed limit, the road width, the presence or absence of a median strip, and various types of regulation information (such as one-way traffic).

The probe determination information is stored in another region of the hard disk unit 77.

Regions functioning as the road data memory 3 (including the first memory section 7 and the third memory section 8) shown in FIG. 1, the determination information storage section obtained by the probe information processing/determining unit 15, and the traffic regulation data memory section 16 are also included in the hard disk unit 77. The probe determination information and/or the traffic regulation data are downloaded via, e.g., the network W.

A flexible drive control unit 81 for reading and writing data from and to a flexible disk 82, and a CD/DVD control unit 83 for reading data from a compact disk 84 are connected to the system bus 72. In the present embodiment, a printer 87 is connected to a printer interface 86.

A keyboard/mouse control unit 91 is connected to the system bus 72 so that data can be input from a keyboard 92 and a mouse 93. A monitor 95 is connected to the system bus 72 via a monitor control unit 94. A CRT type monitor, a liquid crystal display type monitor, a plasma display type monitor, etc. may be used as the monitor 95.

Free slots 96 are prepared in order to allow various elements (such as a modem) to be added.

The system of the embodiment is connected to the network N via a network adapter 97. The probe cars are linked to the network (Internet) N.

Programs (an OS program and an application program (including those of the present invention)), which are required to operate the route regulation information generating apparatus 1 formed by this computer system, are installed in the system via various recording media. For example, such programs can be installed by using a non-writable recording medium (a CD-ROM, a ROM card, etc.) or a writable recording medium (a FD, a DVD, etc.), or in the form of a communication media by using the network N. It should be understood that these programs can be written in advance to the nonvolatile memories 74, 75 and the hard disk unit 77.

According to such a computer system, all the probe information from the probe cars is read into the system via the network adapter 97, and is first stored in a predetermined folder of the hard disk 77. Then, predetermined probe information is extracted from the entire probe information stored in the hard disk 77. The extracted probe information is first stored in the RAM 73.

Then, according to the predetermined program stored in the hard disk 77, the central control unit 20 determines if a right turn is allowed and/or passing through the intersection is allowed for the specific intersection, based on the probe information in the RAM 73.

Figure 6:
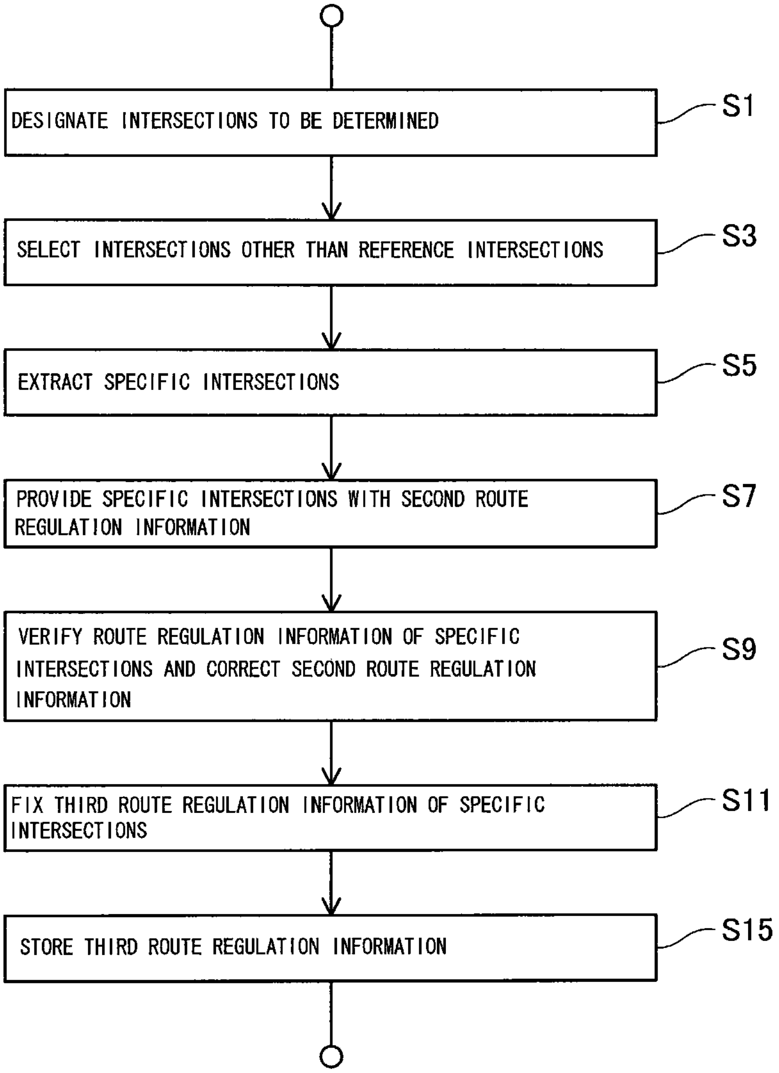
FIG. 6 is a flowchart illustrating operation of the route regulation information generating apparatus of the embodiment.

Operation of the route regulation information generating apparatus 1 of the embodiment of the present invention will be described below (see the flowchart of FIG. 6).

In step 1, intersections to be determined are designated. More specifically, regions of the road map are read on each mesh from the road map data stored in the hard disk unit 77. The central control unit 20 as the intersection designating section 9 designates those intersections which are present in the read region.

In step 3, the central control unit 20 as the intersection selecting section 10 refers to the first memory section 7 to extrude the reference intersections provided with the first route regulation information, from the intersections designated in step 1. This is because the first route regulation information is the information specified by fieldwork and thus need not be corrected. The intersections (those which are not provided with the first route regulation information) other than the reference intersections are selected in this manner.

In step 5, the central control unit 20 as the specific intersection extracting section 11 refers to the link portion information memory section 5 to extract specific intersections from the intersections other than the reference intersections selected in step 3. As used herein, the “specific intersection” refers to an intersection of a main road and a narrow street.

In step 7, the central control unit 20 as the second route regulation information providing section 12 provides all the specific intersections specified in step 5 with the second route regulation information, and stores this in the hard disk unit 77 as the second route regulation information memory section 13. The second route regulation information indicates that a right turn and passing through the intersection are prohibited. As used herein, the “right turn is prohibited” indicates that both a right turn from the main road onto the narrow street and a right turn from the narrow road onto the main road are prohibited. The “passing through the intersection is prohibited” indicates that passing through the intersection across the main road is prohibited.

In step 9, the central control unit 20 as the verifying/correcting section 14 refers to the second route regulation information stored in the second route regulation information memory section 13 and the probe determination information, and verifies the route regulation information of each specific intersection. At this time, it is preferable to refer to the traffic regulation data memory section 16 in addition to referring to the probe determination information, because more accurate route regulation information can be generated.

In the present embodiment, a right turn and/or passing through the intersection is allowed at the specific intersection, (1) if there is a traffic signal, (2) if it is determined from the probe determination information that a right turn is allowed and/or passing through the intersection is allowed, or (3) if there is the traffic regulation data of “traveling in designated directions only,” and the traffic regulations allow a right turn and/or passing through the intersection in the travel direction toward this specific intersection. That is, the prohibition of the right turn and of passing through the intersection provided by the second route regulation information is eliminated. Thus, the route regulation information (the third route regulation information) indicating that a right turn is allowed and/or passing through the intersection is allowed is provided to the specific intersection. In the remaining cases, the content of the second route regulation information is maintained.

In this manner, the route regulation information (the third route regulation information) is fixed for all the specific intersections (step 11).

The third route regulation information fixed in step 11 is written to the third memory section 8 and stored therein.

As the third route regulation information defines route regulations at the specific intersection of the narrow street, the third route regulation information is used to search for routes near a starting location or a destination where a detailed road map is required. That is, the third route regulation information is associated with region data of a relatively low level. In other words, the third route regulation information is provided with such a flag that is associated with the region data of the relatively low level.

Namely, the navigation apparatus that uses node portion information, which is the information of the specific intersections provided with the information of whether a right turn is allowed and the information of whether passing through the intersection is allowed, refers to the information on whether a right turn is allowed and the information on whether passing through the intersection is allowed when searching for a route to the destination in a route computation section in accordance with the conditions designated by the driver. This increases the number of route choices, making it possible for the driver to take a route that is more preferable for the driver.

Figure 7:
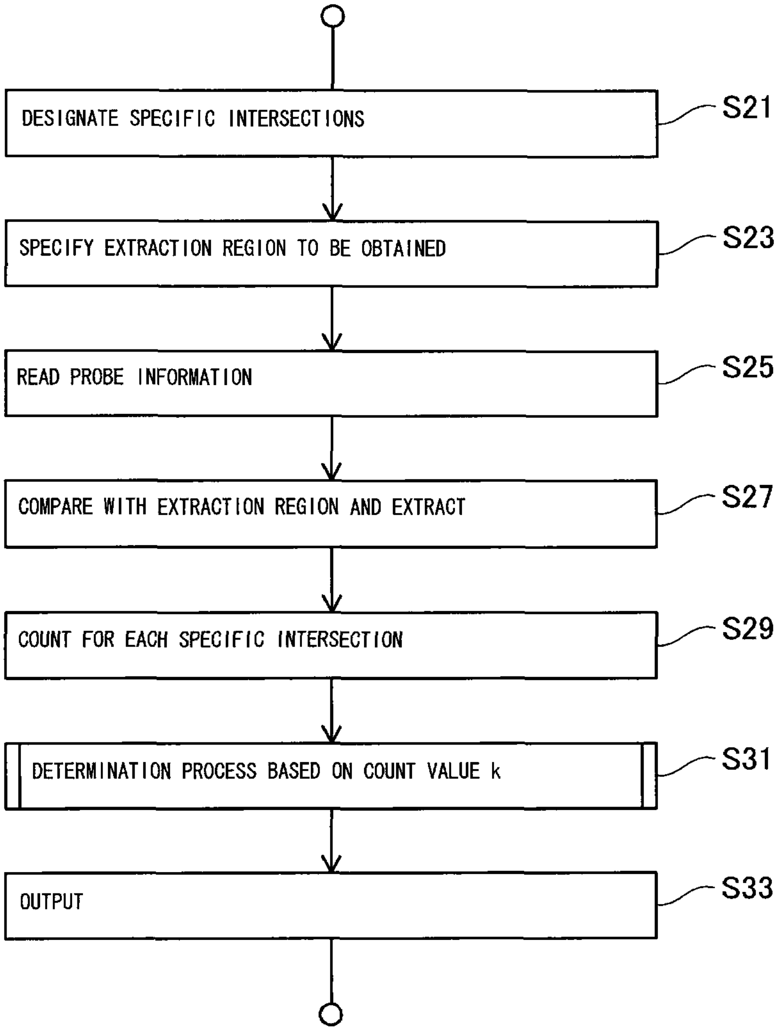
FIG. 7 is a flowchart illustrating operation of the probe information processing/determining unit of the embodiment.

Operation of the probe information processing/determining unit 15 of the present embodiment will be described below (see the flowchart of FIG. 7).

In step 21, the specific intersections extracted in step 5 are read, and as shown in FIG. 4, the central control unit 20 designates the corresponding nodes 105 from the hard disk unit 77.

Then, in step 23, the central control unit 20 specifies, as a specific intersection extraction region providing unit (not shown), the first extraction region 110 (or the second extraction region 111).

The first extraction region 110 is stored in the RAM 73 as the first extraction region memory section 601. Similarly, the second extraction region 111 is stored in the RAM 73 as the second extraction region memory section 602.

Then, in step 25, the central control unit 20 as the probe information read unit 23 reads the probe information from the probe information memory section 21.

In the first probe information extraction unit 301, the information of the extraction region thus read is compared with the first extraction region stored in the RAM 73 by performing step 23. Only the probe information having the first travel histories corresponding to the allowed right turn are extracted from the probe information being in the first extraction region 110 (step 27). The probe information having the second travel histories corresponding to “passing through the intersection across the main road” are similarly extracted from the probe information being in the second extraction region 111.

In step 29, the central processing unit 20 as the first counter unit 401 counts the number of first travel histories extracted in step 27, for each of the specific intersections designated in step 21. The specific intersections and the numbers of travel histories corresponding to the specific intersections are tabulated, and the table data is stored in a predetermined region in the hard disk unit 77.

In step 31, the central processing unit 20 performs, as the first probe information determining unit serving as a determination unit, a determination process based on a first count value $k_1$ of the first travel histories for the specific intersection.

Similarly, the second counter unit 403 also operates, and the central processing unit 20 performs, as the second probe information determining unit, a determination process based on a second count value $k_2$ of the second travel histories for the specific intersection.

Figure 8:
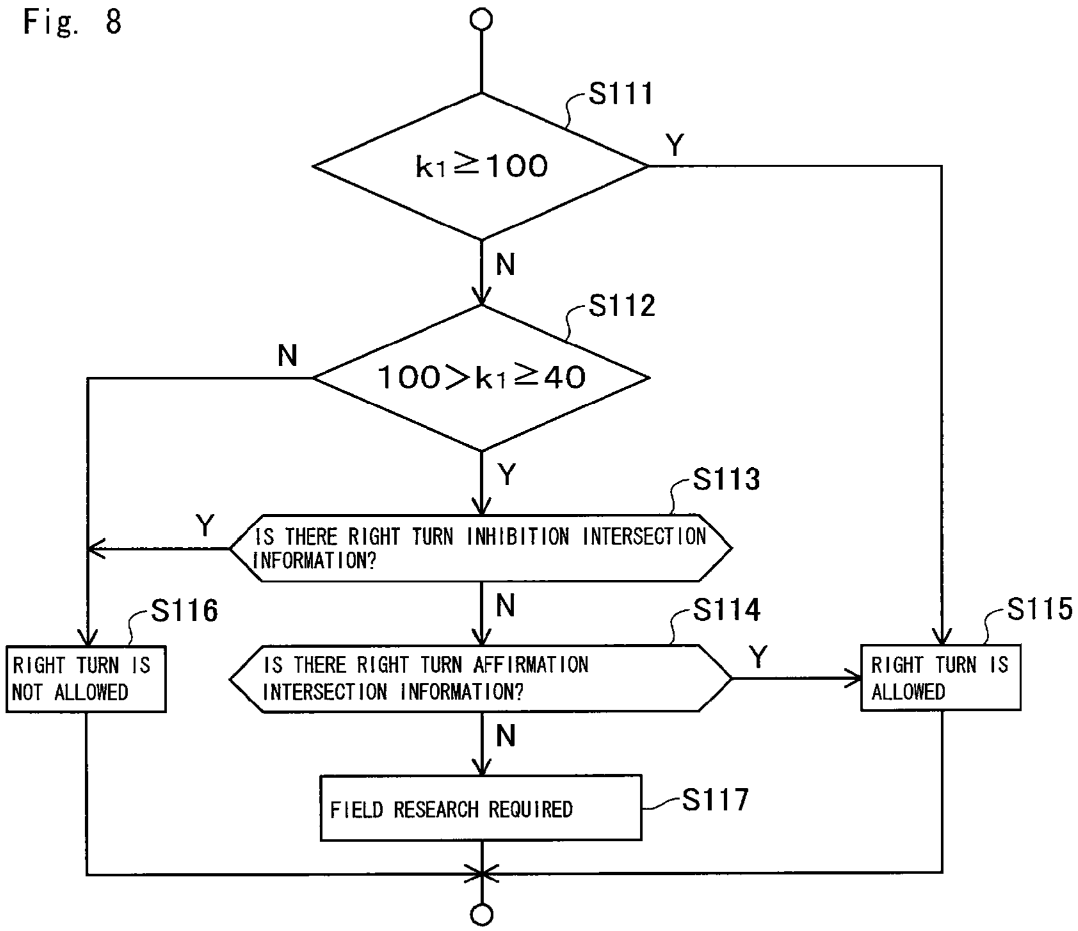
FIG. 8 is a flowchart illustrating processing of step 31 in FIG. 7.

As shown in FIG. 8, if the first count value $k_1$ is 100 or more (step 111), it is determined that a right turn is allowed at the corresponding specific intersection (step 115). If the first count value $k_1$ is less than 40 (step 112: N), it is determined that a right turn is not allowed at the corresponding specific intersection (step 116). The first threshold value (=100) and the second threshold value (=40) are stored in the hard disk unit 77, and are read by the central control unit 20 so as to be used in the processing of steps 111 and 112.

If the first count value $k_1$ is 40 or more and less than 100, the routine proceeds to step 113. In step 113, the central control unit 20 reads the traffic regulation data associated with the specific intersection from the traffic regulation data memory section 16. If information that actively denies a right turn at the intersection (hereinafter also referred to as the "right turn inhibition intersection information") is present in this traffic regulation data, the routine proceeds to step 116, where it is determined that a right turn is not allowed. If there is no right turn inhibition intersection information in step 113, the routine proceeds to step 114, where the traffic regulation data is read in a manner similar to that of step 113 to verify the presence or absence of information that actively permits a right turn at the intersection (hereinafter also referred to as the "right turn affirmation intersection information"). If there is the right turn affirmation intersection information, the routine proceeds to step 115, where it is determined that a right turn is allowed.

The right turn affirmation intersection information includes, e.g., the cases where a traffic signal is present, and where a right turn is not prohibited by the traffic regulations of "traveling in designated directions only." On the other hand, the right turn inhibition intersection information includes, e.g., the case where a right turn is prohibited by the traffic regulations of "traveling in designated directions only."

If the presence of the right turn affirmation intersection information cannot be confirmed in step 114, the routine proceeds to step 117, and defines that field research is required to determine if a right turn is allowed at the specific intersection.

In the flow of FIG. 8, it is preferable to perform step 113 in the case of $k_1 \geq 100$ as well to check the traffic regulation data, in order to further increase reliability.

Figure 9:
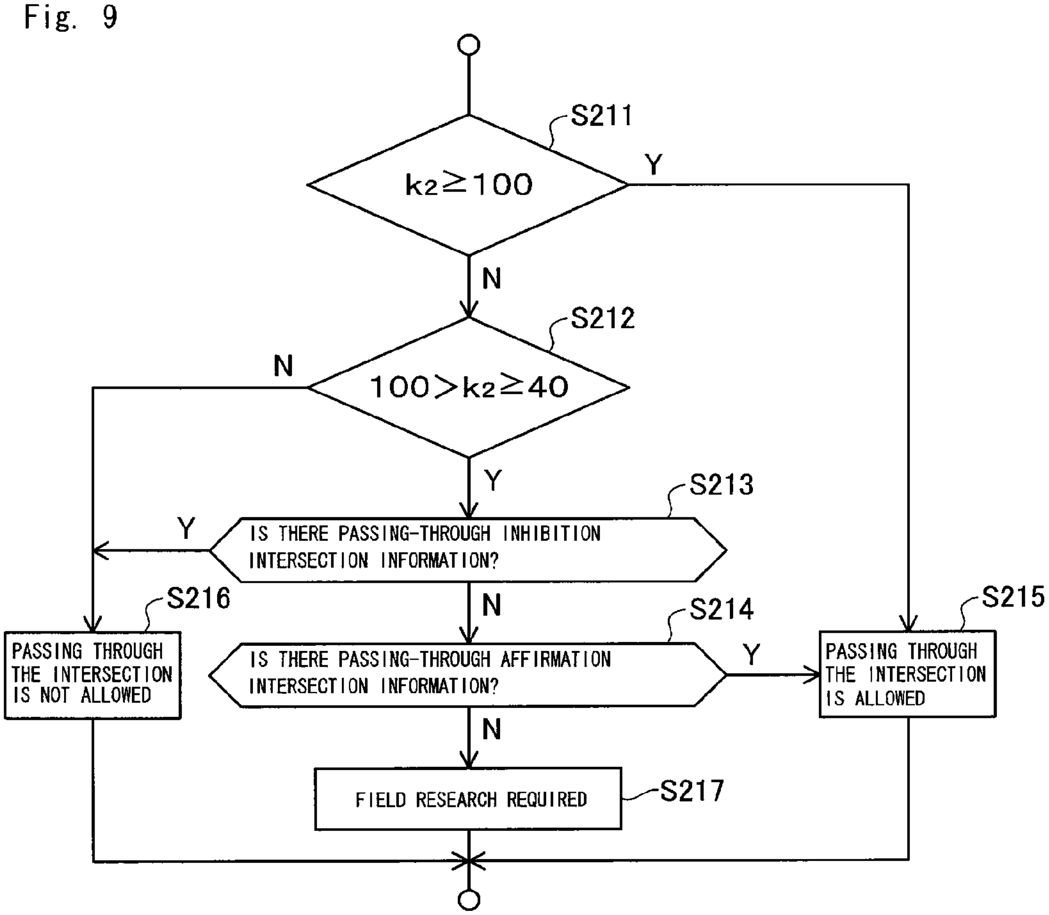
FIG. 9 is a flowchart illustrating processing of step 31 in FIG. 7

Similarly, whether passing through the intersection is allowed or not is determined from the processing result based on the second count value $k_2$, and the verification and correction are performed in the verifying/correcting section 14 (see FIG. 9).

That is, if the second count value $k_2$ is 100 or more (step 211), it is determined that passing through the corresponding specific intersection is allowed (step 215). If the second count value $k_2$ is less than 40 (step 212: N), it is determined that passing through the corresponding specific intersection is not allowed (step 216). The third threshold value (=100) and the fourth threshold value (=40) are stored in the hard disk unit 77, and are read by the central control unit 20 so as to be used in the processing of steps 211 and 212.

If the second count value $k_2$ is 40 or more and less than 100, the routine proceeds to step 213. In step 213, the central control unit 20 reads the traffic regulation data associated with the specific intersection from the traffic regulation data memory section 16. If passing-through inhibition intersection information is present in this traffic regulation data, the routine proceeds to step 216, where it is determined that passing though the intersection is not allowed. If there is no passing-through inhibition intersection information in step 213, the routine proceeds to step 214, where the traffic regulation data is read in a manner similar to that of step 213 to verify the presence or absence of passing-through affirmation intersection information. If there is the passing-through affirmation intersection information, the routine proceeds to step 215, where it is determined that passing through the intersection is allowed.

As used herein, the "passing-through affirmation intersection information" refers to the information that actively permits passing through the intersection, and includes, for example, the cases where a traffic signal is present, and where passing through the intersection is not prohibited by the traffic regulations of "traveling in designated directions only." On the other hand, the "passing-through inhibition intersection information" refers to the information that actively denies passing through the intersection, and includes, e.g., the case where passing through the intersection is prohibited by the traffic regulations of "traveling in designated directions only."

If the presence of the passing-through affirmation intersection information cannot be confirmed in step 214, the routine proceeds to step 217, and defines that field research is required to determine if passing through the specific intersection is allowed.

In the flow of FIG. 9, it is preferable to perform step 213 in the case of $k_2 \geq 100$ as well to check the traffic regulation data, in order to further increase reliability.

Moreover, the road information associated with the specific intersection may be provided in advance with a degree of reliability of whether a right turn is allowed and a degree of reliability of whether passing through the intersections is allowed. When the intersection information associated with the specific intersection is read, each degree of reliability of the intersection information is computed, and the computation result is compared with a predetermined threshold value, whereby whether a right turn is allowed and whether passing through the intersection is allowed can be determined for the specific intersection.

That is, the number of travel histories can be counted for each specific intersection, and can be compared with the predetermined threshold value corresponding to the degree of reliability of whether a right turn is allowed and/or the degree of reliability of whether passing through the intersection is allowed and a determination can be made. Then, the determination result can be stored, in association with the specific intersection, as the degree of reliability of whether a right turn is allowed and/or the degree of reliability of whether passing through the intersection is allowed.

Thus, by providing the specific intersections with the degree of reliability of whether a right turn is allowed and/or the degree of reliability of whether passing through the intersection is allowed, those specific intersections which the vehicle can easily turn right or which the vehicle can easily pass through can be preferentially guided upon navigation, whereby safer routes can be provided to the user.

Figure 10:
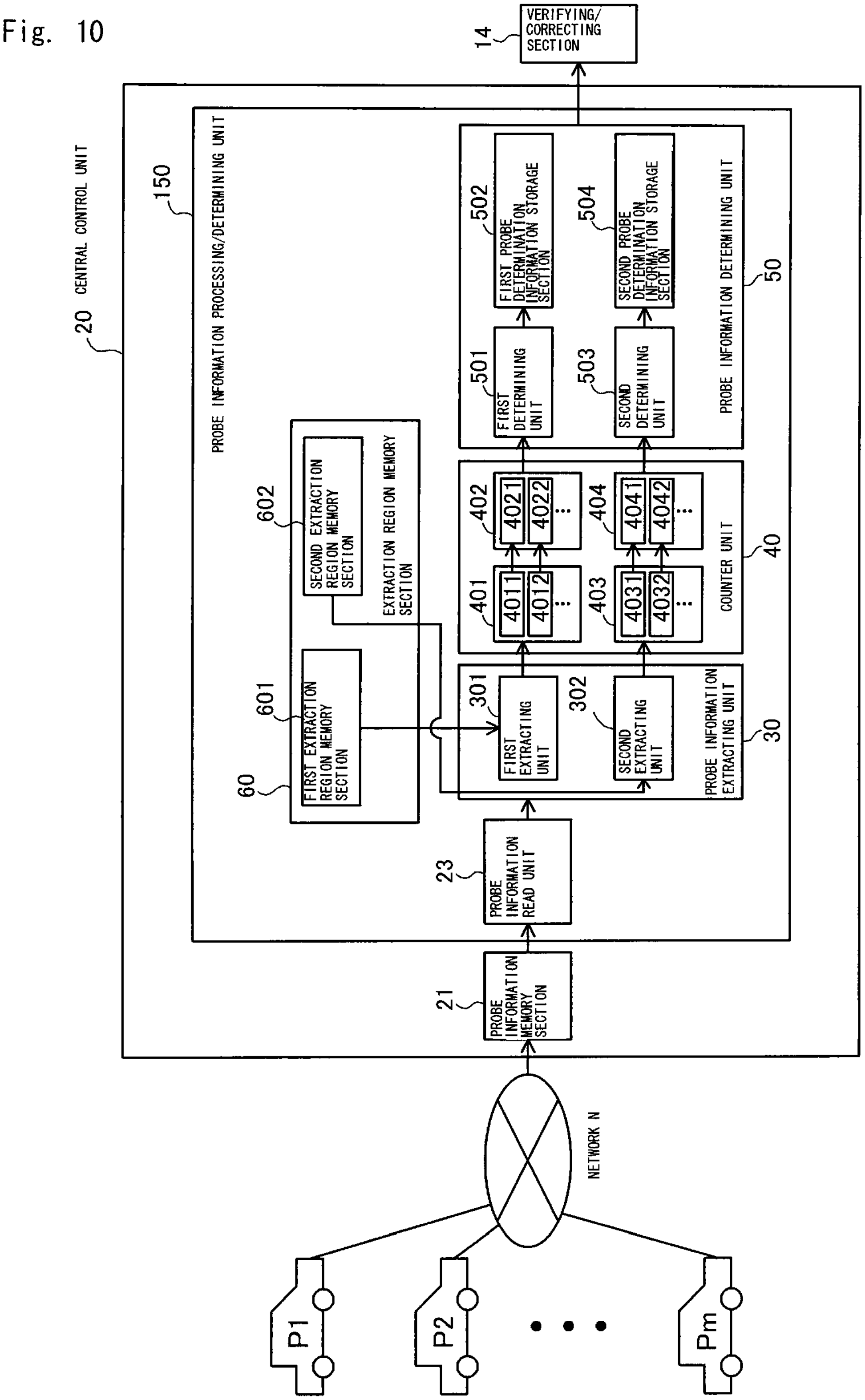
FIG. 10 is a block diagram showing the structure of a route regulation information generating apparatus according to another embodiment of the present invention.

FIG. 10 is a block diagram of a probe information processing unit 150 according to another embodiment of the present invention. In FIG. 10, the elements having the same functions as those of FIG. 2 are denoted by the same reference characters, and description thereof will be omitted. The first counter unit 401 in the counter unit 40 of the probe information processing unit 150 has first condition handling counter units 4011, 4012 . . . **401*n* for counting the number of travel histories that are transmitted from the probe information extracting unit 30 for each of the designated conditions for each specific intersection. The count values obtained by the first condition counter units are stored in first condition handling counter memory sections 4021, 4022 . . . 402$n$. The first probe information determining unit 501 makes a determination for each of the travel histories stored in the first condition handling counter memory section 4021, and stores the result in the first probe determination information storage section 502. The verifying/correcting section 14 generates third route regulation information for each of the designated conditions, based on the determination result stored in the first probe determination information storage section. The third route regulation information is stored in the third memory section in association with the specific intersections for each of the designated conditions. For example, if the first condition counter units for time slots are provided, whether a right turn is allowed or not can be determined for each time slot. Similarly, regarding the second counter unit 402** as well, whether passing through the intersection is allowed or not can be determined for each of the designated conditions.

The thus obtained information on whether a right turn is allowed at the specific intersection and whether passing through the specific intersection is allowed is used as the road information in the navigation apparatus. In this navigation apparatus, by using such more detailed road information (whether a right turn is allowed or not, whether passing through the intersection is allowed) that is obtained for each of the conditions for each specific intersection, routes that are more preferable for the driver are searched for by the navigation apparatus.

The following will next be disclosed.

A $4A^{th}$ aspect of the present invention is defined as follows.

The apparatus for generating route regulation information defined in any one of the above first to third aspects is characterized by further including a traffic regulation data memory section for storing traffic regulation data of the specific intersection, wherein the route regulation information verifying/correcting device performs the verification based on the probe determination information and the traffic regulation data.

According to the apparatus for generating route regulation information of the $4A^{th}$ aspect thus defined, the third route regulation information is generated based on the probe determination information and the traffic regulation data. This increases reliability of the route information provided to the specific intersection.

In the above description, there are currently 98 types of regulations as the traffic regulation data. Data associated with the specific intersection are used in such traffic regulations. As used herein, the "data associated with the specific intersection" is not limited to data directly associated with the specific intersection, such as the presence or absence of a traffic signal. In order to specify the travel direction, a combination of a road before entering the intersection and a road after leaving the intersection forms the data associated with the specific intersection.

Only the data associated with the specific intersection may be stored in the traffic regulation data memory section, or all of the 98 types of regulations may be stored as data in the traffic regulation data memory section. In the latter case, required data is selected for use.

A $5A^{th}$ aspect of the present invention is defined as follows.

In the apparatus for generating route regulation information defined in any one of the first to third and $4A^{th}$ aspects, when the determination result of the first determining device indicates that a right turn is allowed, and the traffic regulation data indicates that a right turn is allowed, the route regulation information verifying/correcting device makes the correction of the provided route regulation information so that the route regulation information indicates that a right turn is allowed.

According to the apparatus for generating route regulation information of the $5A^{th}$ aspect thus defined, when both the probe determination information and the traffic regulation data indicate that a right turn is allowed, the route regulation information is corrected so as to indicate that a right turn is allowed. This increases reliability of the information regarding whether a right turn is allowed, which is provided to the specific intersection.

A $6A^{th}$ aspect of the present invention is defined as follows.

In the apparatus for generating route regulation information defined in any one of the first to third and $4A^{th}$ aspects, when the determination result of the second determining device indicates that passing through the intersection is allowed, and the traffic regulation data indicates that passing through the intersection is allowed, the route regulation information verifying/correcting device makes the correction of the provided route regulation information so that the route regulation information indicates that passing through the intersection is allowed.

According to the apparatus for generating route regulation information of the $6A^{th}$ aspect thus defined, when both the probe determination information and the traffic regulation data indicate that passing through the intersection is allowed, the route regulation information is corrected so as to indicate that passing through the intersection is allowed. This increases reliability of the information regarding whether passing through the intersection is allowed, which is provided to the specific intersection.

The present invention is not limited to the above description of the modes for carrying out the invention and the embodiments of the present invention. Various modifications that can be readily made by those skilled in the art without departing from the scope of the claims are intended to be included in the present invention.

DESCRIPTION OF THE REFERENCE NUMERALS

1 Route Regulation Information Generating Apparatus
7 First Memory Section
8 Third Memory Section
9 Intersection Designating Section
10 Intersection Selecting Section
11 Specific Intersection Extracting Section
12 Second Route Regulation Information Providing Section
14 Verifying/Correcting Section
15 Probe Information Processing/Determining Unit
16 Traffic Regulation Data Memory Section
21 Probe Information Memory Section
23 Probe Information Extracting Unit
40 Counter Unit
50 Probe Information Determining Unit
60 Extraction Region Memory Section
100 Specific Intersection
101, 102 Link
105 Node
110, 111 Extraction Region

The invention claimed is:

1. An apparatus for generating intersection route regulation information, comprising:

a first memory section that stores first route regulation information of each intersection;

a probe information processing/determining device that processes probe information to make a determination;

a probe determination information storage section that stores probe determination information obtained by said probe information processing/determining device;

a determination object intersection designating device that designates an intersection to be determined in road map information;

a determination object intersection selecting device that refers to said first memory section for said designated intersections to be determined, and selects said intersections to be determined without said first route regulation information provided;

a second route regulation information providing device that provides each specific intersection of a main road and a narrow street, among said selected intersections to be determined, with second route regulation information that indicates that a right turn and passing through said specific intersection are prohibited;

a route regulation information verifying/correcting device that verifies said second route regulation information provided to said specific intersection based on said probe determination information, and corrects said second route regulation information based on the result of said verification;

a third route regulation information generating device that generates third route regulation information based on the result of said verification and correction of said route regulation information verifying/correcting device; and a third memory section that stores said third route regulation information in association with said specific intersection.

2. An apparatus according to claim 1, wherein that said probe information processing/determining device further includes a probe information memory section that stores said probe information, a first extraction region memory section that stores a first extraction region as a region for extracting said probe information of a vehicle that is estimated to have turned right at said specific intersection, a first probe information extracting device that extracts, from said probe information read from said probe information memory section, said probe information that has first travel history for which it is determined that said vehicle has turned right at said specific intersection, among travel histories of said probe information in said first extraction region, a first count device that counts, for each said specific intersection, the number of said first travel histories extracted by said first probe information extracting device, and a first determining device that determines that a right turn is allowed at said specific intersection whose first count value counted by said first count device is equal to or larger than a first threshold value.

3. An apparatus according to claim 1, wherein that said probe information processing/determining device further includes a second extraction region memory section that stores a second extraction region as a region for extracting said probe information of said vehicle that is estimated to have passed through said specific intersection, a second probe information extracting device that extracts, from said probe information read from said probe information memory section, said probe information that has second travel history for which it is determined that said vehicle has passed through said specific intersection, among travel histories of said probe information in said second extraction region, a second count device that counts, for each said specific intersection, the number of said second travel histories extracted by said second probe information extracting device, and a second determining device that determines that passing through said specific intersection is allowed if said specific intersection has second count value counted by said second count device being equal to or larger than a second threshold value.

4. An apparatus according to claim 2, wherein that said first count device further counts, for each of designated conditions, the number of said first travel histories extracted by said first probe information extracting device, said first determining device makes said determination for each of said designated conditions with respect to said first travel histories counted for each of said designated conditions, and said third memory section stores for each of said designated conditions said third route regulation information in association with said specific intersection.

5. An apparatus according to claim 3, wherein that said second count device further counts, for each of designated conditions, the number of said second travel histories extracted by said second probe information extracting device, said second determining device makes said determination for each of said designated conditions with respect to said second travel histories counted for each of said designated conditions, and said third memory section stores for each of said designated conditions said third route regulation information in association with said specific intersection.

6. An apparatus according to claim 4, wherein that said designated conditions include a time slot, a day of a week, and/or time required for turning right at said specific intersection.

7. An apparatus according to claim 5, wherein that said designated conditions include a time slot, a day of a week, and/or time required for passing through said specific intersection.

8. A method for generating intersection route regulation information, comprising:

a probe information processing/determining step of processing probe information to make a determination;

a determination object intersection designating step of designating an intersection to be determined in road map information;

a determination object intersection selecting step of referring to a first memory section that stores first route regulation information for said designated intersections to be determined, and selecting said intersections to be determined without said first route regulation information provided;

a second route regulation information providing step of providing each specific intersection of a main road and a narrow street, among said selected intersections to be determined, with second route regulation information that indicates that a right turn and passing through said specific intersection are prohibited;

a route regulation information verifying/correcting step of verifying said second route regulation information provided to said specific intersection based on probe determination information obtained in said probe information processing/determining step, and correcting said second route regulation information based on the result of said verification; and a third route regulation information generating step of generating third route regulation information based on the result of said verification and correction in said route regulation information verifying/correcting step.

9. A method according to claim 8, wherein that said probe information processing/determining step further includes a first extraction region setting step of setting a first extraction region as a region for extracting said probe information of a vehicle that is estimated to have turned right at said specific intersection, a first probe information extracting step of extracting, from said probe information read from a probe information memory section that stores said probe information, said probe information that has first travel histories being determined that said vehicle has turned right at said specific intersection, among travel histories of said probe information in said first extraction region, a first count step of counting, for each said specific intersection, the number of said first travel histories extracted in said first probe information extracting step, and a first determining step of determining that a right turn is allowed at said specific intersection whose first count value counted in said first count step being equal to or larger than a first threshold value.

10. A method according to claim 8, wherein that said probe information processing/determining step further includes a second extraction region setting step of setting a second extraction region as a region for extracting said probe information of said vehicle that is estimated to have passed through said specific intersection, a second probe information extracting step of extracting, from said probe information read from said probe information memory section, said probe information that has second travel histories being determined that said vehicle has passed through said specific intersection, among travel histories of said probe information in said second extraction region, a second count step of counting, for each said specific intersection, the number of said second travel histories extracted in said second probe information extracting step, and a second determining step of determining that passing through said specific intersection is allowed if said specific intersection has second count value counted in said second count step being equal to or larger than a second threshold value.

11. A method according to claim 9, wherein that in said first count step, the number of said first travel histories extracted in said first probe information extracting step is further counted for each of designated conditions, and in said first determining step, said determination is made for each of said designated conditions with respect to said first travel histories counted for each of said designated conditions.

12. A method according to claim 10, wherein that in said second count step, the number of said second travel histories extracted in said second probe information extracting step is further counted for each of designated conditions, and in said second determining step, said determination is made for each of said designated conditions with respect to said second travel histories counted for each of said designated conditions.

13. A method according to claim 11, wherein that said designated conditions include a time slot, a day of a week, and/or time required for turning right at said specific intersection.

14. A method according to claim 12, wherein that said designated conditions include a time slot, a day of a week, and/or time required for passing through said specific intersection.

* * * * *